July 16, 1940.　　　E. W. SCOTT ET AL　　　2,208,396

DUAL-VOLTAGE APPARATUS

Original Filed Feb. 26, 1938

WITNESSES:

INVENTORS
Eugene W. Scott &
Robert H. Tull
BY
ATTORNEY

Patented July 16, 1940

2,208,396

UNITED STATES PATENT OFFICE 2,208,396

DUAL-VOLTAGE APPARATUS

Eugene W. Scott, East Springfield, and Robert H. Tull, Springfield, Mass., assignors to Westinghouse Electric & Manufacturing Company, East Pittsburgh, Pa., a corporation of Pennsylvania Original application February 26, 1938, Serial No. 192,764. Divided and this application December 1, 1938, Serial No. 243,384

3 Claims. (Cl. 172—278)

This application is a division of our application Serial No. 192,764, filed February 26, 1938, for Dual-voltage apparatus.

Our invention relates to dual-voltage electric apparatus, and it has particular relation to dual-voltage refrigerating units.

It is an object of our invention to provide electric apparatus, and particularly an electric motor, having a plurality of main windings and an auxiliary circuit, and having terminal connections whereby the main windings may be connected in series for high-voltage operation and in parallel for low-voltage operation, and connections for energizing the auxiliary circuit in shunt across one of said main windings, whereby said main windings, in their series connection, operate as a voltage-divider for said auxiliary circuit. The auxiliary circuit may be either a starting-winding circuit for the main motor, or it may be a smaller-size auxiliary motor. It will readily be seen that our invention makes it possible to utilize the same auxiliary circuit on either the high-voltage or the low-voltage circuit-connections of the main apparatus, thereby reducing the number of parts which must be manufactured and carried in stock, and reducing the cost of the aggregate.

A further object of our invention is to provide a dual-voltage electric apparatus, and particularly a dual-voltage electric motor, with a current-responsive device which responds approximately to the same speed or load of the motor or other apparatus, whether said motor or other apparatus is operating on its high-voltage connections or on its low-voltage connections. This object of our invention is accomplished by so energizing the current-responsive device that its current is not materially changed when the connections are changed from high-voltage to low-voltage or vice versa. Specifically, the current-responsive device is connected in series-circuit relation to one of a plurality of windings, which are connected in series for high-voltage operation and in parallel for low-voltage operation.

Figure 1:
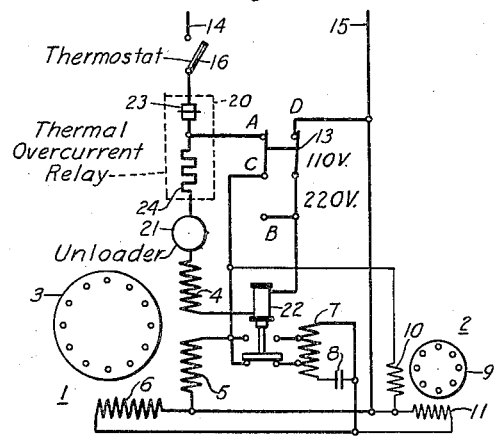
Figure 2:
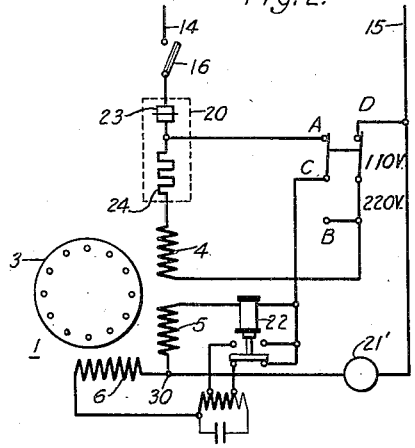

With the foregoing and other objects in view, our invention consists in the circuits, apparatus, combinations and methods hereinafter described and claimed and illustrated in the accompanying drawing, wherein:

Figure 1 is a diagrammatic view of circuits and apparatus embodying our invention in a preferred form of embodiment, and Fig. 2 is a similar view illustrating a slight variation in the connections of one of the current responsive devices.

Our invention, as shown in Fig. 1, was particularly designed for a dual-voltage refrigerator unit, and particularly for a unit which had to be designed so that it would be provided with a set of terminal connections which could readily be arranged for either 110-volt operation or 220-volt operation, according to the requirements of the purchaser of the equipment.

The particular refrigerating unit illustrated in Fig. 1 comprises a main motor 1, adapted to drive a compressor (not shown) of the refrigerating equipment, and a small auxiliary fan-motor 2, adapted to drive a fan (not shown) for air-cooling the refrigerating equipment.

The main motor 1 comprises a squirrel-cage rotor-member 3, two main primary windings 4 and 5, and a dephased auxiliary or starting-winding 6, the latter being connected in shunt to the main winding 5, through a serially connected auto-transformer 7 which is connected in series with the auxiliary winding 6, the two elements 6 and 7 being connected in shunt to the main winding 5. The auto-transformer 7 is utilized as a means for providing a high voltage which is applied to a capacitor 8 which causes the motor 1 to start and run as a capacitor-motor. The capacitor 8 is thus a serially related part of the circuit of the auxiliary winding 6, and gives said circuit an impedance-characteristic such as to cause the current in the auxiliary winding 6 to be dephased with respect to the current in the main windings 4 and 5.

The fan-motor 2 has a squirrel-cage rotor-member 9, a main winding 10 and an auxiliary winding 11, the main and auxiliary windings 10 and 11 being permanently connected in parallel with the main and auxiliary windings 5 and 6 of the main motor 1.

In order that the aggregate shown in Fig. 1 may be adapted for operation on either 110 volts or 220 volts, separate terminal connections A and B are provided for the main winding 4, and other terminal connections C and D are brought out for the other main winding 5, and a terminal board is arranged, as symbolized by a double-throw switch 13, whereby the main windings 4 and 5 may be connected either in series, for 220-volt operation, or in parallel for 110-volt operation, as shown, according to the voltage of the supplying line 14—15.

The starting and stopping of the refrigerating unit shown in Fig. 1 is under the control of a thermostat or low-pressure control-device 16, which is illustrated symbolically as a simple switch. When this switch closes, the aggregate must start up by itself, and when the switch 16 opens, the aggregate must cease operating.

There are three automatic controlling or safety features associated with the unit shown in Fig. 1, and these must all be arranged so that they operate satisfactorily on both the low-voltage and the high-voltage connections of the unit. The three devices just mentioned are a thermal overcurrent relay 20, an unloader device 21, and a speed-responsive undercurrent relay 22.

The thermal overcurrent relay 20 comprises a normally closed thermally responsive contact-device 23, connected in series with the supply-lead 14, and a small heater 24 connected in series with the main winding 4 and disposed in thermal relation to the thermally responsive contact-device 23. The object of his thermal overcurrent relay is to serve the function of a fuse or other circuit-interrupter for disconnecting the motor in case it should become overloaded or short circuited.

The current-responsive device which is indicated symbolically at 21, and which is designated in Fig. 1 as an unloader-device, is utilized in connection with the refrigerating unit for bypassing the compressor (not shown), so as to reduce the load on the main motor 1 during the starting period. The unloader is connected in series with the main winding 4, and, during the initial starting period, is energized with a sufficient in-rush of current to cause the operation of said unloader 21, whereas, when the motor approaches its full speed, the current subsides to a value which permits the unloader to return to its inoperative position. This current-responsive device 21 may be regarded as symbolic of any current-responsive device which is utilized for any purpose whatsoever.

The undercurrent relay 22, shown in Fig. 1, is also connected in series with the main motor-winding 4. This relay is utilized as a speed-responsive device for responding indirectly to the speed of the main motor, because the starting-current reduces in value as the motor picks up speed, during the starting operation. When the undercurrent relay 22 picks up, upon the initial in-rush of starting current, it changes the taps on the series auto-transformer 7 so as to have a relatively small number of turns in the primary winding, thereby increasing the voltage applied to the capacitor 8, and providing the equivalent of a large capacitance for starting. During normal running conditions, a smaller effective value of capacitance is desired, and this is obtained by causing the setting of the undercurrent relay 22 to be such that at a suitable point in the starting-operation of the main motor 1, as at half-speed, or any other desired percentage of normal speed, the undercurrent relay 22 drops out and increases the number of primary turns on the series auto-transformer 7, as indicated.

It will be observed that our current-responsive devices 20, 21 and 22 are all connected so as to be responsive to a current which is approximately the same regardless of whether the motor is connected for 110-volt operation or for 220-volt operation, said current being, in this case, the current flowing in the main winding 4, although any other current, which does not materially change with the position of the double-throw switch 13, may be utilized. It will be understood that the current in each of the main windings 4 and 5 of our motor is substantially the same, whether those windings are connected in parallel for 110-volt operation, or in series for 220-volt operation.

It will be further observed that we have utilized two auxiliary circuits which are dependent upon the voltage appearing across the terminals of either one of the main windings, such as the main winding 5 in the particular case of Fig. 1. These voltage-responsive circuits are the auxiliary-winding circuit consisting of the auxiliary winding 6 and its serially connected capacitor 8, and the main winding 10 of the fan-motor 2. Since the voltage appearing across the main-winding 5 is substantially 110 volts, regardless of whether the 110-volt connection or the 220-volt connection is utilized, it will thus be seen that we have provided an aggregate or unit in which it is not necessary to change the voltage of the auxiliary circuits 6—7—8 and 10, the only change necessary being the change from the parallel to the series connection of the two main windings 4 and 5.

As has been intimated, the precise connections shown in Fig. 1 need not be followed exactly, as the current-responsive devices 20, 21 and 22 may be energized in response to any currents which are substantially unaffected by the terminal-voltage connections, and the voltage-responsive auxiliary circuits may be connected across either one of the two main windings 4 or 5.

In the particular apparatus shown in Fig. 2, for example, the fan-motor 2 has been omitted, and the unloader 21' has been connected in a circuit which is responsive to the combined currents of the main winding 5 and the auxiliary winding 6, being connected in the circuit which extends, from the junction-point 30 of these two windings, to the supply-lead 15 which is connected to the terminal-connector D of the terminal board. Whenever we refer to a response to the current in one of the main windings 4 or 5, in this specification or in the appended claims, we mean, by such reference, to include the unloader-21' connection in Fig. 2.

While we have described our invention in two exemplary forms of embodiment, we wish it to be distinctly understood that the illustrated forms are only by way of example and not by way of limitation, as it will be obvious that those skilled in the art can adopt many variations in the precise forms of embodiment of our invention without departing from its essential features, particularly in its broader aspects. We desire, therefore, that the appended claims shall be accorded the broadest interpretation consistent with their language and the prior art.

We claim as our invention:

1. A dual-voltage motor-aggregate comprising a main motor and a smaller auxiliary motor, said main motor comprising a plurality of main windings, terminal connections whereby said main windings may be connected in series for high-voltage operation and in parallel for low-voltage operation, and connections for energizing a winding of said auxiliary motor in shunt across one of said main windings, whereby said main windings, in their series connection, operate as a voltage-divider for said auxiliary motor.

2. A dual-voltage motor-aggregate comprising a dual-voltage self-starting single-phase main motor and a smaller self-starting single-phase auxiliary motor; said main motor having a plurality of main windings, an auxiliary-winding circuit having such impedance as to cause it to be traversed by current which is dephased with respect to the current in the main windings, terminal connections whereby said main windings may be connected in series for high-voltage operation and in parallel for low-voltage operation, and connections for energizing said auxiliary circuit in shunt across one of said main windings; said auxiliary motor comprising a main winding, an auxiliary winding, connections for energizing the main winding of the auxiliary motor in shunt across one of the main windings of the main motor, and connections for energizing the auxiliary winding of the auxiliary motor in shunt across at least a portion of the auxiliary-winding circuit of the main motor; whereby the main windings of said main motor, in their series connection, operate as a voltage-divided for said auxiliary-winding circuit of the main motor and for the main winding of the auxiliary motor; and whereby the auxiliary-winding circuit of the main motor, when the main motor is running, operates as a phase-splitter for energizing the auxiliary winding of the auxiliary motor.

3. A dual-voltage motor-aggregate comprising a dual-voltage self-starting single-phase main motor and a smaller self-starting single-phase auxiliary motor; said main motor having a plurality of main windings, terminal connections whereby said main windings may be connected in series for high-voltage operation and in parallel for low-voltage operation, a current-responsive device, connections for causing said current-responsive device to be responsive to the current in one of said main windings in both the series-winding high-voltage connection and the shunt-winding low-voltage connection, an auxiliary-winding circuit, said auxiliary-winding circuit comprising an auxiliary winding and an external circuit including a serially connected capacitor connected in series with each other and in shunt across one of the main windings, and means for utilizing said current-responsive device to alter the external-circuit connections of said auxiliary-winding circuit in response to the subsidence of the starting-current inrush; said auxiliary motor comprising a main winding, an auxiliary winding, connections for energizing the main winding of the auxiliary motor in shunt across one of the main windings of the main motor, and connections for energizing the auxiliary winding of the auxiliary motor in shunt across the auxiliary winding of the main motor; whereby the main windings of said main motor, in their series connection, operate as a voltage-divider for said auxiliary-winding circuit of the main motor and for the main winding of the auxiliary motor; and whereby the auxiliary winding of the main motor, when the main motor is running, operates as a phase-splitter for energizing the auxiliary winding of the auxiliary motor.

EUGENE W. SCOTT.
ROBERT H. TULL.